(12) United States Patent
Wuoti et al.

(10) Patent No.: US 9,026,144 B2
(45) Date of Patent: May 5, 2015

(54) LOCATION TAGGING

(75) Inventors: Tuomas Wuoti, Turku (FI); Bjorn Sjolund, Turku (FI); Gabriel Nyman, Turku (FI); Niclas Jern, Turku (FI); Mika Marjalaakso, Espoo (FI)

(73) Assignee: Mobio Oy, Turku (FI)

( * ) Notice: Subject to any disclaimer, the term of this patent is extended or adjusted under 35 U.S.C. 154(b) by 803 days.

(21) Appl. No.: 13/289,003

(22) Filed: Nov. 4, 2011

(65) Prior Publication Data

US 2012/0191512 A1 Jul. 26, 2012

Related U.S. Application Data

(60) Provisional application No. 61/436,199, filed on Jan. 26, 2011, provisional application No. 61/475,736, filed on Apr. 15, 2011, provisional application No. 61/535,220, filed on Sep. 15, 2011.

(51) Int. Cl.
*H04W 4/02* (2009.01)
*G06Q 30/02* (2012.01)
*G06Q 10/06* (2012.01)

(52) U.S. Cl.
CPC .......... *G06Q 30/0207* (2013.01); *H04W 4/023* (2013.01); *G06Q 10/06* (2013.01)

(58) Field of Classification Search
CPC .......................... H04W 4/023; G06Q 30/0207
USPC ................ 455/456.2, 456.3, 67.11; 705/14.1; 709/229
See application file for complete search history.

(56) References Cited

U.S. PATENT DOCUMENTS

2009/0143078 A1* 6/2009 Tu et al. ................ 455/456.3
2012/0054355 A1* 3/2012 Arrasvuori et al. ........... 709/229

* cited by examiner

*Primary Examiner* — Phuoc H Doan
(74) *Attorney, Agent, or Firm* — Ziegler IP Law Group LLC.

(57) ABSTRACT

A method and system for verifying an indoor position using Wireless Local Area Networks (WLAN), access points (AP), and Assisted Global Positioning System (A-GPS). The goal of this method is to determine if a user is in the place where he claims to be by using a mobile device. When a user wants his location to be verified he activates a scanning process on his mobile device that reads all the requested signals (WLAN, A-GPS). When the recording process is complete the information is sent to a server where it is processed and the user location is either confirmed to be true or false.

24 Claims, 13 Drawing Sheets

LOCATION TAGGING

CROSS-REFERENCE TO RELATED APPLICATIONS

This application claims priority to and the benefit of, U.S. Provisional Patent Application Ser. No. 61/436,199, filed on 26 Jan. 2011; U.S. Provisional Patent Application Ser. No. 61/475,736, filed on 15 Apr. 2011, and U.S. Provisional Patent Application Ser. No. 61/535,220, filed on 15 Sep. 2011, the disclosures of which are incorporated herein by reference in their entirety,

BACKGROUND

1. Field

The aspects of the disclosed embodiments generally relate to positioning and locations systems, and in particular to verifying consumer location or presence in a certain place and associating names and tags to certain places.

2. Brief Description of Related Developments

One big trend in mobile marketing is the "check-in" feature. In a check-in service, consumers use, for example, a mobile device, to inform a service that they are in a certain location such as, for example, a shop or restaurant. Check-in generally refers to a user confirming to the check-in service provider that he is actually in a specific place such as a shop or restaurant using the mobile device. There is a need for higher accuracy for these kinds of check-ins, as they are increasingly being connected with actual value services that give cash rewards for customer loyalty. There is a need for verification of the check-in to confirm that the user is really in the specific place he claims to be.

Indoor location technologies are generally known. In one example, a mobile terminal (MT) or other mobile device scans a Wireless Local Area Network (WLAN) environment and uses, for example, the Time Difference on Arrival (TDOA) to estimate the distance of the mobile terminal from a transmitting antenna. As the TDOA is measured from several base stations, the location can be estimated.

Another method of indoor location is the so-called fingerprinting method using a Received Signal Strength Indicator (RSSI). Location fingerprinting is used to determine the location of the mobile device based upon matching the information from multiple receivers (or transmitters) with earlier measurements.

One problem with earlier location methods is that they require detailed maps of the indoor environments to be available. Additionally, they require updating the database if the setup of the WLAN network is changed. Adding further to the problem is the fact that traditional means of determining a location, i.e. Global Positioning System (GPS), are often not possible to use inside buildings.

The methods of TDOA and matching RSSI fingerprints to detailed maps also typically require a significant amount of signal processing capability on the mobile terminal.

WO2011019125A1 describes a method of determining an indoor position in which a wireless terminal is located by using a signal fingerprint of a WLAN received signal strength indicator (RSSI) in combination with a place label inputted by a user to a place server. One problem with this prior art location method is that it requires the user to provide a place label.

Accordingly, it would be desirable to provide a system that addresses at least some of the problems identified above.

BRIEF DESCRIPTION OF THE DISCLOSED EMBODIMENTS

As described herein, the exemplary embodiments overcome one or more of the above or other disadvantages known in the art.

One aspect of the exemplary embodiments relates to a method and system for verifying user location in a space.

At least some embodiments of the disclosure provide a method for verifying an indoor position using Wireless Local Area Networks (WLAN), access points (AP), and Assisted Global Positioning System (A-GPS). The aspects of the disclosed embodiments advantageously determine if a user is in the place where he claims to be by using a mobile device. When a user wants his location to be verified he may activate a scanning process on his mobile device, or the scanning process may be activated automatically by, for example, an application executed in the mobile device that reads all the requested signals (WLAN, A-GPS). When the scanning or recording process is complete, the information is sent to a server where it is processed and the user location is either confirmed to be true or false. In one embodiment, the user location may be sent to a merchant for use, for example, in invoicing or advertising.

In one aspect, the disclosed embodiments are directed to an apparatus configured to verify a desired location of a mobile terminal. In one embodiment, a positioning device is coupled to the mobile terminal, the positioning device configured to obtain coarse location information corresponding to a current position of the mobile terminal. A controller is coupled to the mobile terminal, the controller having a memory in communication with a processor, the memory including program instructions for execution by the processor to collect the coarse positioning data corresponding to the current location of the mobile terminal, verify that the coarse location information approximately corresponds to relative position of the desired location, collect precise location data corresponding to the current location of the mobile terminal if the coarse location information corresponds to the relative position of the desired location, and verify that the precise location data corresponds to the desired location.

In another aspect, the disclosed embodiments are directed to a system for verifying a location of a mobile terminal. In one embodiment, the system includes a verification server, and a verification database coupled to the server, wherein the verification server comprises a memory in communication with a processor, the memory including program instructions for execution by the processor to detect a location verification request for a desired location of the mobile terminal, receive coarse location data corresponding to a current location of the mobile terminal, determine if the coarse location data corresponds to a general area of the desired location, receive precise location data corresponding to the current position of the mobile terminal, and determine that current location is the desired location if the precise location data corresponds to the desired location.

In a further aspect, the disclosed embodiments are directed to a method. IN one embodiment, the method includes receiving a location identification verification request, the request including a location identification parameter, comparing the identification parameter with one or more pre-stored identification parameters, if a match exists, sending a corresponding location identifier to verify the location, or if no match exists, requesting additional location identification information.

These and other aspects and advantages of the exemplary embodiments will become apparent from the following detailed description considered in conjunction with the accompanying drawings. It is to be understood, however, that the drawings are designed solely for purposes of illustration and not as a definition of the limits of the invention, for which reference should be made to the appended claims. Moreover, the drawings are not necessarily drawn to scale and unless otherwise indicated, they are merely intended to conceptually illustrate the structures and procedures described herein. In addition, any suitable size, shape or type of elements or materials could be used.

DETAILED DESCRIPTION OF THE
EXEMPLARY EMBODIMENTS OF THE
DISCLOSURE

The aspects of the disclosed embodiments are generally concerned with improving reliability of the check-in of a customer or user to a certain place. Reliability is improved with a verification method or service. The following description is merely used to describe certain aspects of the disclosed embodiments and it is not to be limiting in any way.

Figure 1:
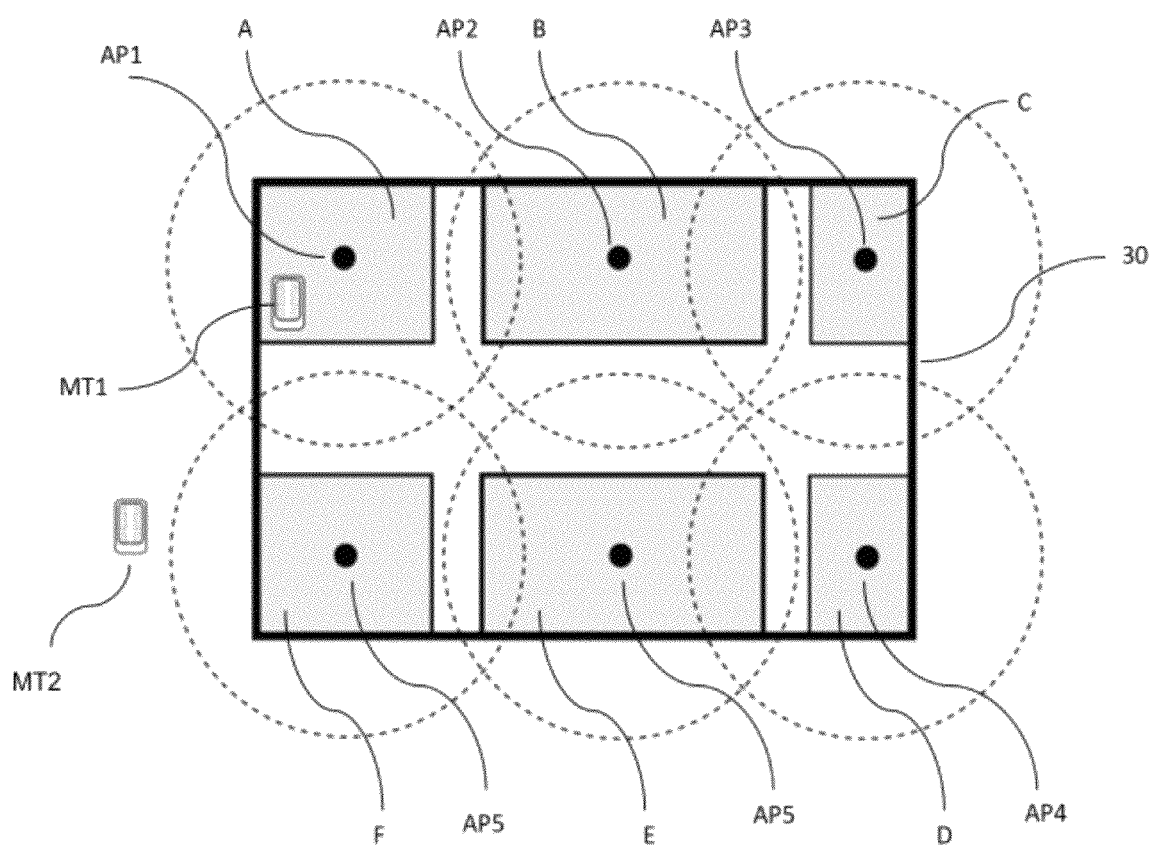
FIG. 1 shows a schematic picture of an physical environment where aspects of the disclosed embodiments can be applied.

FIG. 1 illustrates an example environment where certain aspects of the disclosed embodiments might be applied. In the environment of FIG. 1, a building 30 contains six different shops (spaces) A, B, C, D, E and F. There are six WLAN access points (AP1, AP2, AP3, AP4, AP5, AP6) installed in the different shops, although in alternate embodiments more or less access points can be used. There are two mobile terminals MT1 and MT2. MT2 is located outside of the building 30 and MT1 is located inside of the building 30 in shop or store A.

According to the embodiments of FIG. 1, mobile terminals MT1 and MT2 have a check-in application installed on the terminal. A check-in application refers to an application which is used by a user or consumer to indicate to, for example, a store owner or other merchant that the consumer is in or at the store location. Mobile terminals MT1 and MT2 are capable of sending and receiving wireless signals and can also have, for example, GPS enabled as an alternate positioning method. The mobile terminals can have WLAN capabilities. As used herein, the term "mobile terminal" or "device" generally refers to terminals like cellular telephones, smart phones, mobile phones, handsets, Personal Digital Assistants (PDA), pads, laptops, or other similar communication and computing devices.

Figure 5:
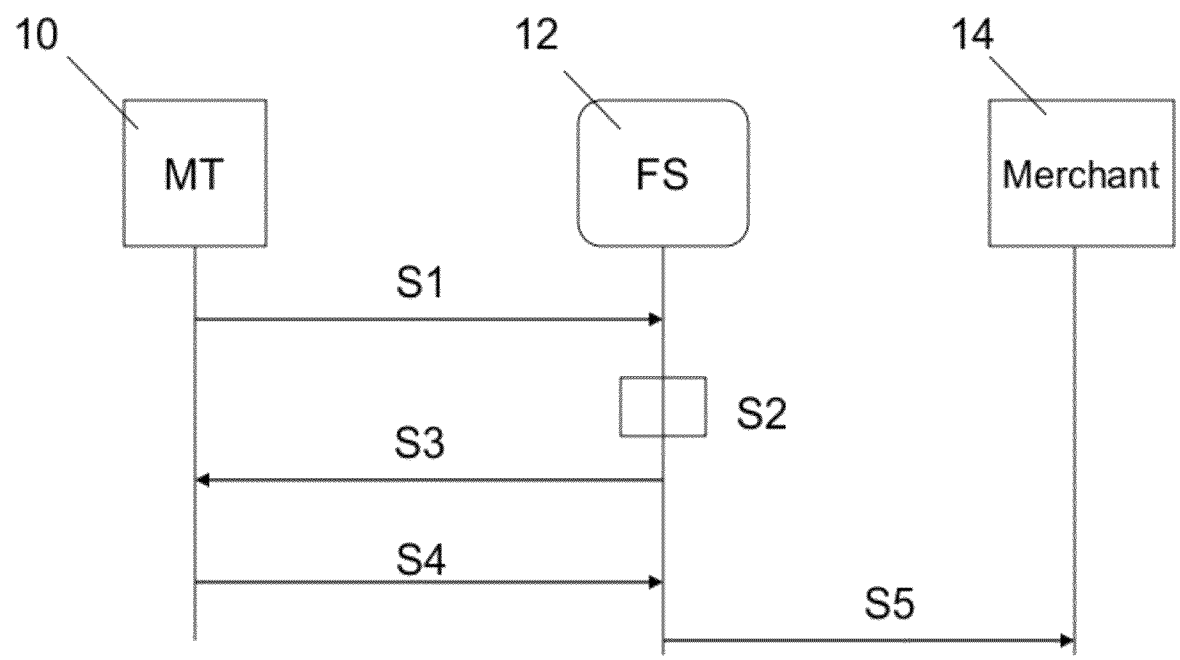
FIG. 5 is a flow chart related to check-in without verification.

As described earlier, one big trend in mobile marketing is the "check-in" feature. FIG. 5 schematically illustrates a currently used check-in process. A mobile device or mobile terminal (MT) 10 includes a check-in application. The mobile terminal 10 is used to inform a check-in service provider 12 that he is in the specific location or area of the merchant 14 which can be, for example, a shop, restaurant, or other location. Currently, a major player in "check-in" service providers is Foursquare™ (http://foursquare.com/). Foursquare™ provides a user with an application executed on the phone or mobile terminal 10. The Foursquare™ application can be downloaded to the mobile terminal 10 in a suitable fashion. The aspects of the disclosed embodiments are not however limited to the Foursquare™. The application can be any application downloaded in the terminal. It can also be a native application and/or part of the operating system or other lower level functionality. Check-in service can be the only functionality of the application or it can be part of the functionality of another application.

In the process of FIG. 5, in step S1, the application executed on mobile terminal 10 sends location data (based on A-GPS) to service system 12. Service system 12 analyzes the received location data at step S2. The service system 12 provides back to the user a list of locations, or merchant locations, nearby where he may check-in (S3). In one embodiment, "location" or "merchant location" generally refers to a merchant services location, and can include for example, a store, building, service center, reception area, kiosk, or other suitable facility or location where a user may check-in to avail themselves of the services or goods provided by the merchant(s). The user can "check-in" in to one of the locations using the application in the mobile terminal 10, as in Step S4. Service provider 12 can provide a report to merchant 14 about a successful check-in, as in step S5.

As the user is checked in to the location, he might receive, for example, discount coupons or other benefits related to the store or merchant 14 location where he is checked in. Typically, the merchant or store owner 14 pays the service provider 12 for the check-in service allowing a user to check-in at their location. Since it is critical for a business to know if the consumer is physically located in the store or not when they check-in, a secure verification method is needed.

Figure 3:
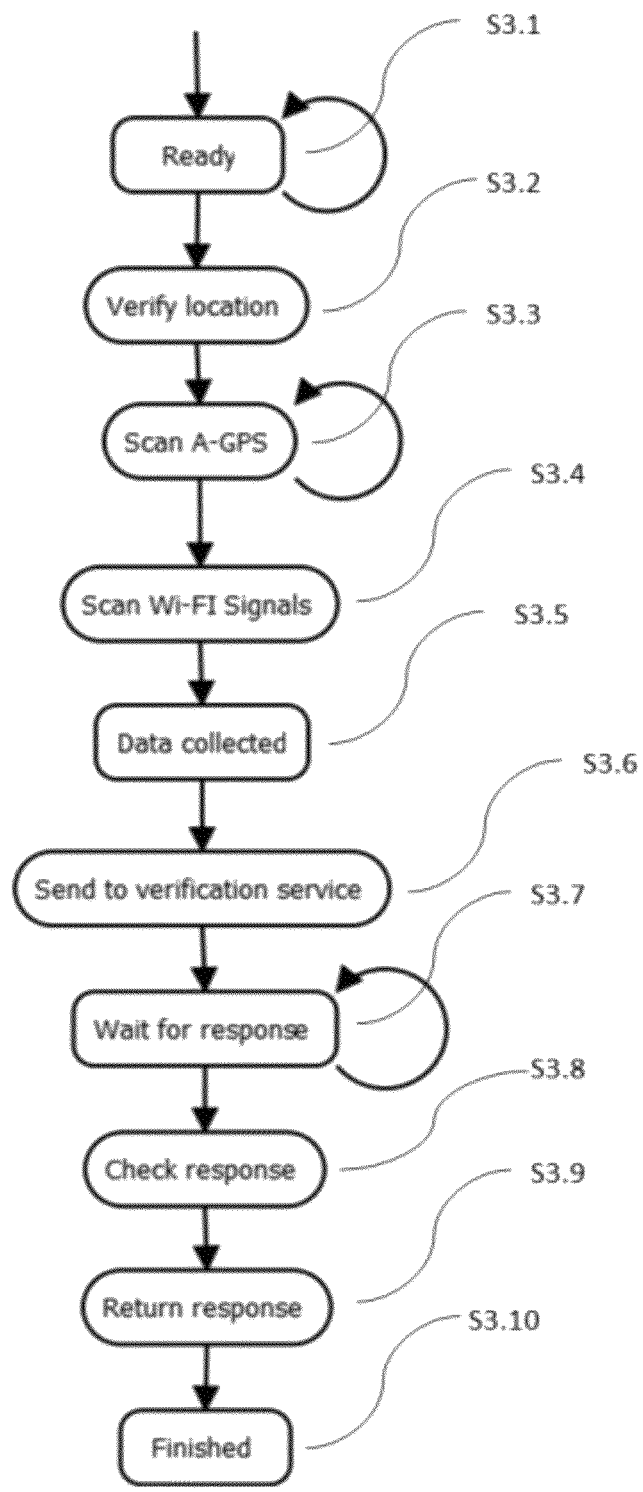
FIG. 3 shows some of the steps for verification in accordance with an embodiment of the disclosure.

Referring to FIG. 3, a method of verifying a user's location according to one embodiment is shown. The mobile terminal is ready S3.1 to begin verification. The user initiates a verification request (S3.2). The mobile terminal scans for coarse location information S3.3, using for example, the A-GPS chip. In alternate embodiments, any suitable location or positioning device or system can be used to obtain the coarse location information. The mobile terminal scans S3.4 the available WLAN access points and records their signal output data. The mobile terminal collects S3.5 all necessary data. The mobile terminal sends S3.6 the recorded data to the verification service over a 3G or WLAN connection, for example. In alternate embodiments, the data can be sent over any suitable communication connection. The mobile terminal waits S3.7 for the verification service to respond. The mobile terminal analyzes S3.8 the results returned by the service. The mobile terminal gives a response S3.9 to the user. The verification process is then complete S3.10.

Figure 4:
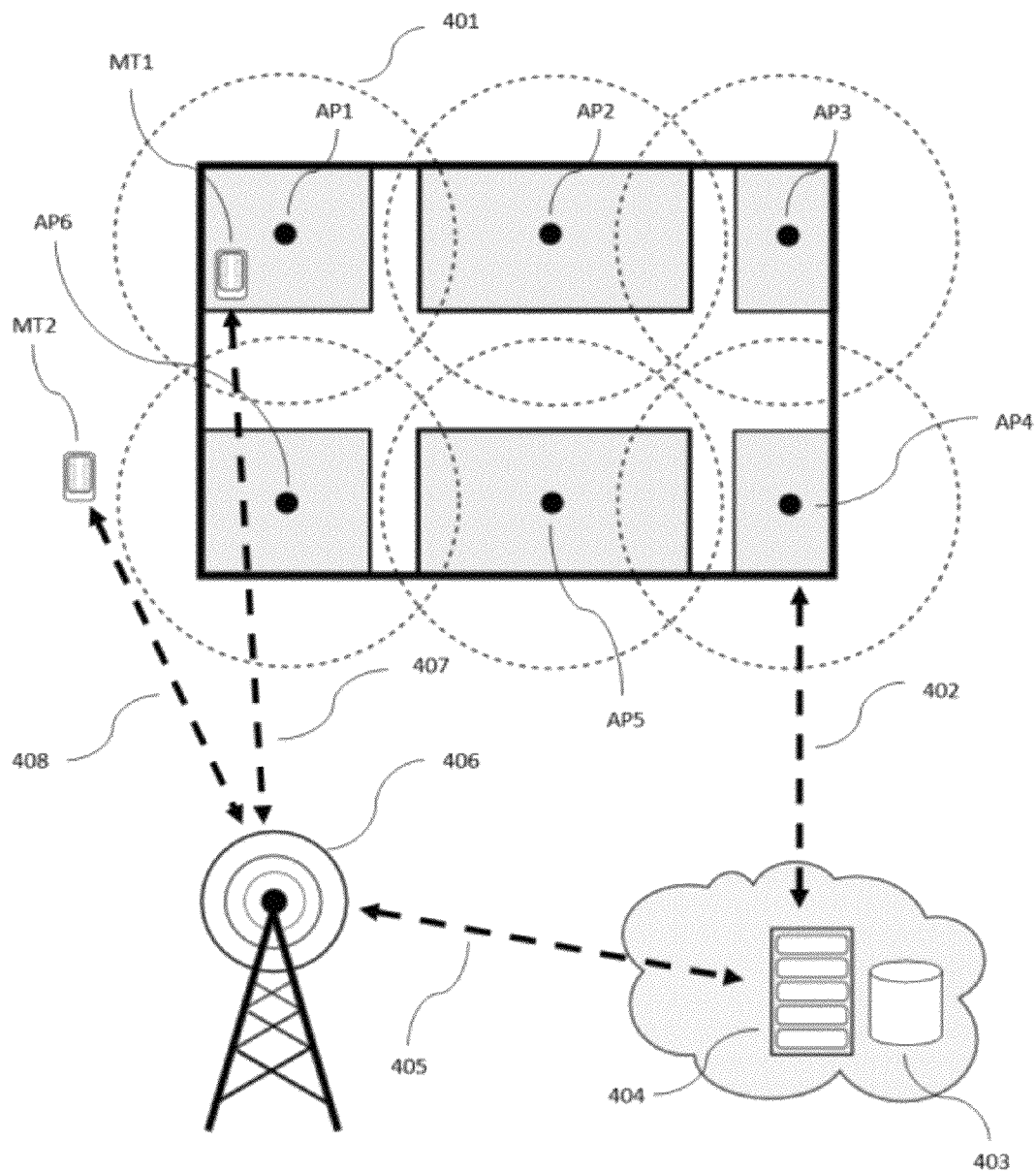
FIG. 4 is a schematic diagram showing a communication environment or network and some of the servers.

FIG. 4 illustrates an environment where the verification method according to the aspects of the disclosed embodiments can be used. The environment of FIG. 4 is similar to that described above in reference to FIG. 1 and like reference numbers are used to show similar features. MT1 and MT2 are mobile terminals used by the check-in service. AP1, AP2, AP3, AP4, AP5 and AP6 are WLAN access points. 401 is a depiction of the signal outputted by the router of API, i.e. the "normal" usage radius of the AP1 signal. For the embodiments of the present disclosure one should understand that signals from the access points can be received from a larger area as well, and that the radio network topology is only illustrative. A connection 402 such as a Digital Subscriber Line or Internet Protocol (IP) connection exists between the access points and a server 404. Database 403 contains the necessary data for the location verification and server 404 running the verification service. The connection between a cell tower 406 and the server 405 is typically an IP connection. The cell tower 406 with data connectivity such as $3^{rd}$ generation (3G) enables a wireless IP connection 407, 408 between mobile terminals MT1 and MT2 and Internet services such as server 404. In alternate embodiments, the connection can be according to a current standard.

Referring now to FIGS. 3 and 4, in one embodiment, the user of mobile terminal MT1 initiates S3.2 a check-in service application claiming to be inside of, or within an area of shop A. A-GPS information is used S3.3 to check if the user is in proximity of the location (i.e. mobile terminal MT1 could be close to shops A, B, C or D). Since mobile terminal MT1 is close to shop A, mobile terminal MT1 sends S3.6 information about the radio environment, as received by MT1 WLAN chip, to the Verification Service database 403 and server 404 using wireless connection 407. In this example it is assumed that mobile terminal MT1 can receive some signal information from access points AP1 and AP5. This information is analyzed by the Verification Service database 403 and/or server 404. The Verification service compares previously recorded information of what the radio environment should be inside of shop A to determine if mobile terminal MT1 is in the shop or not. This method is referred to in the disclosed embodiments as RSSI fingerprint matching, and involves comparing the previously recorded data to the newly acquired and detecting similarities.

Figure 6:
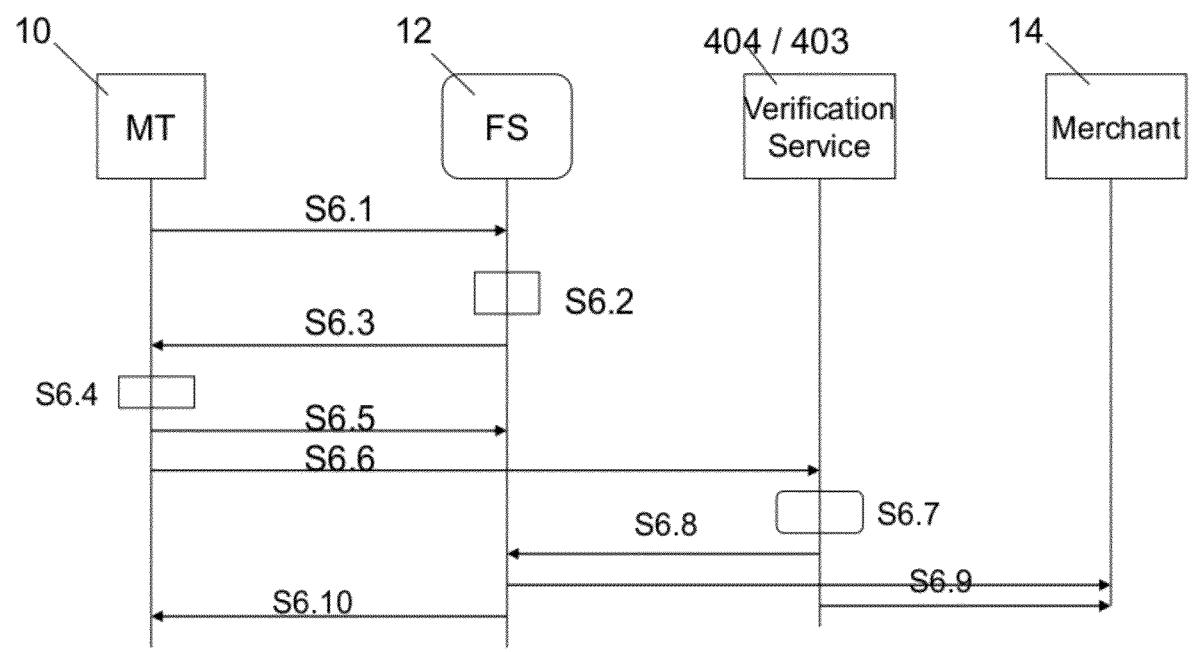
FIG. 6 is a flow chart related to check-in with verification.

One embodiment of a check-in using the verification method of the disclosed embodiments is illustrated in FIG. 6. When a check-in application (with verification functionality) is used by the user, mobile terminal 10 sends S6.1 an approximate location to check-in service 12. Check-in service provider 12 analyzes S6.2 and provides S6.3 a list of possible places where the user may check-in. According to one embodiment, the user decides to check-in in S6.4. The mobile terminal sends S6.5 check-in information to service provider 12 and sends S6.6 information relating to the radio network or radio environment to verification service server 404 and database 403. Mobile terminal 10 may send additional A-GPS information and place identification information to Verification Service 404/403 simultaneously with the radio environment information. In alternate embodiments, mobile terminal 10 may send the additional A-GPS information and place identification information earlier, for example, at the same time as it is sent to service provider 12, i.e. during S6.1. Alternatively, this information may be sent to service provider 12, which then routes the information to Verification Service 404/403. In this embodiment, the terminal needs to connect with only one server system at a time. Verification Service 404/403 analyses S6.7 the received information and compares it with known fingerprints of the claimed location.

If the check-in location of mobile terminal MT10 matches the fingerprints in the database 403, confirmation is sent S6.8 to check-in service 12. Check-in service 12 then sends S6.9 the verified information about the checked-in user to merchant 14. The verified location information can be used, for example, for advertising purposes by merchant 14 or invoicing purposes by service provider 12. In an alternate embodiment, verification service 404/403 can send verification information directly to merchant 14, as in step S6.9, without first going through the service provider 12. Mobile terminal MT1 user might be informed about successful or unsuccessful verification of check-in (S6.10).

Figure 2:
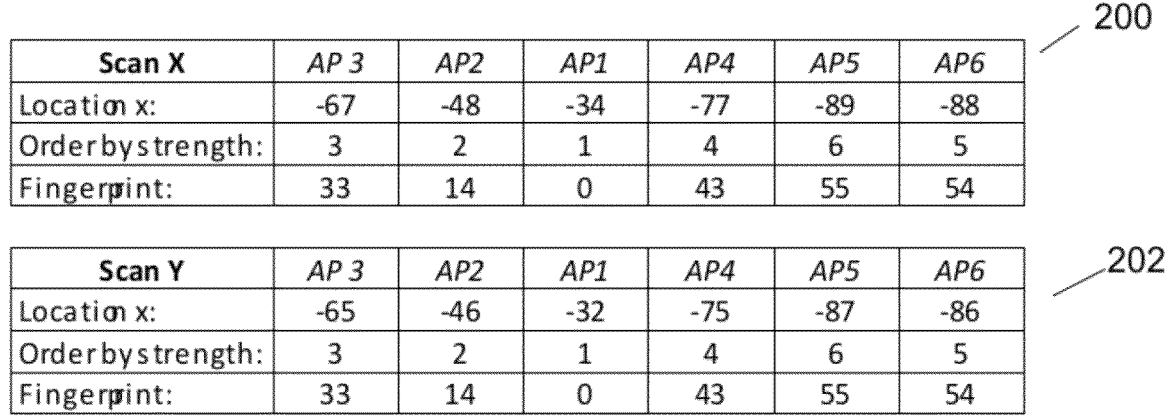
FIG. 2 is an example of RSSI measurement and resulting fingerprint according to aspects of the disclosed embodiments.

Different mobile terminals might receive WLAN access point signal strengths differently due to their WLAN chip type and physical construction. This presents a problem for the fingerprinting process since it relies on matching substantially identical signal strengths with a specific location. According to one embodiment, this is solved by using an assumption (as it is in most cases) that RSSI is measured on a scale of −10 to −110 dBM. This means that even though there is a slight difference with each mobile terminal they still follow the same linear scale. Thus, one embodiment of the method measures the signal difference between the strongest and the rest of the received signals. FIG. 2 illustrates an example of this process. It is assumed for the example that there are two mobile terminals making a scan of a WLAN environment. Both terminals are in location x (for example, location of MT1 in shop A as in FIG. 3). It is further assumed that mobile terminals have measured RSSI of access points AP1, AP2, AP3, AP4, AP5 and AP6 at the location x which is in shop A. (In the example it is assumed that radio signals can propagate through one or more walls).

In tables 200 and 202 of FIG. 2, results of two scans are shown. "Location x"-row values in 200 and 202 refer to measured RSSI from each of the access points. According to embodiments of the disclosure, an algorithm is used to compare two different measurements. In the first step, measured values of AP1-AP6 are ordered by the strength, giving number 1 for the strongest signal (in the example AP1 which is closest to mobile terminal MT1 is given number 1) and 6 on the weakest signal, as shown in row "Order by strength". It is apparent for one of skill in the art that there might be more or less access points in the system than six. Even though both Scan X 200 and Scan Y 202 in FIG. 2 have measured different values, the linear scaling allows us to extract a fingerprint that is comparable between the two. Scaling is done by allocating value 0 for the strongest signal (AP1 in the example) and calculating the difference between other measured signals in comparison to the strongest. Scan X in location x gave different values for RSSI than Scan Y in the same location x. The above-described scaling, however, enables the creation of identical fingerprints for the measurements.

This fingerprint is, in some embodiments, sent to verification service 403/404 or to check-in service 12 as indication of the place of the mobile terminal 10 and the user. It should be noted that other scaling mechanisms could be used as well, for example, by selecting the second strongest signal as the reference or the third strongest signal as the reference, etc. It should be noted as well that algorithms in verification service can compare, for example, sent fingerprint to stored fingerprints in the database. Such a comparison might include methods like a one-to-one comparison or looking at probabilities of fingerprint match the location identification.

Every check-in can have two distinct purposes, the primary purpose can be the location verification and the secondary can be the gathering of access point data that adds to the accuracy of the verification.

Referring again to FIGS. 3 and 4, another aspect of the disclosed embodiments can be illustrated by an example where mobile terminal MT2 is making a check-in claiming to be in shop A. Again the process involves measuring coarse information from A-GPS S3.3 to determine possible locations where mobile terminal MT2 could be (i.e. in Shop A, B, C, D, E or F) to determine if shop A is in the list of shops available for check-in. Next, the WLAN Access Point radio signals S3.4 are scanned and the A-GPS and AP data is sent S3.6 to the verification service 404/403. The verification service 404/403 analyzes the received data (for example info about AP1, AP5 and AP2). First the user's position is determined using the A-GPS data, if it is considered close enough to the check-in location, it proceeds with comparing the measured WLAN AP signals with those that have been pre-recorded, i.e. fingerprint matching. The data is analyzed and if a fingerprint match is found the check-in is verified as true. In the above example, the fingerprint of the location of MT2 does not correlate sufficiently with the fingerprint of the store A, since mobile terminal MT2 is located outside of the building. Thus, verification service 404/403 will inform check-in service 12 that the user is not in store A.

The aspects of the disclosed embodiments advantageously enables the identification of which store or part of the store the customer is in. There is no need to know the location of any of the base stations since the interest is to match the "fingerprint" of the radio network to certain areas.

Aspects of the verification service according to the disclosed embodiments might require that the user is using a mobile phone capable of scanning a WLAN network and communicate over the network or a wireless network such as 3rd generation cellular network (3G-connection). There is also a need for a GPS chip that allows for coarse estimation of a user's position. However, the disclosed embodiments are not limited to terminals with WLAN and/or GPS only. According to some embodiments, scanning of other local area radios or short range networks such as Bluetooth can be used. In some embodiments, coarse estimation of a user's position can be done, for example, via cellular network cell identification or other positioning technologies using cellular networks.

In one embodiment, the verification process is initiated by the user requesting to have their location verified. When a user selects to have their location verified, the software or application running on the mobile terminal is initiated and starts gathering a coarse A-GPS location. If this location is remotely close to the area where the verification request is targeted the next step is automatically initiated. This step scans the WLAN networks available and sends the collected data to a verification service 404/403 running the positioning engine. The data is then analyzed on the server and once a result has been determined, a true or false response is returned to the mobile terminal and displayed to the user.

The positioning engine looks for familiar RSSI fingerprints and uses these to calculate the probability that the user is in the location where he claims to be.

The fingerprint collection process:

Every time a user requests that his location be verified and performs the subsequent scans he is also contributing to the database 403 of available WLAN data. This database is continuously analyzed and the collected information is compared with previous results. The comparison process will group similar scans together and discard irrelevant or outlying scans. Once the groups have been created the most "visible" group will be selected as the most likely source of reliable WLAN data. The routers in this group will be given a weight that marks their importance in the positioning process—the higher the weight the more important a router is. The location identification (ID) related database 403 is created automatically.

According to another embodiment, if there is no data in the verification service database related to the fingerprint of a particular location, the verification cannot be done immediately. However, according to the disclosed embodiments the database can store received fingerprints and user claimed identifications (check-in ID) in the database. There can be an algorithm in the verification system, which will accept a fingerprint as valid finger print in case a sufficient amount of users have sent the same fingerprint to the verification server. Additionally there can be validated users such as store owners that can send "official" fingerprints to database.

Additionally, from time to time, WLAN configurations might change. For example, shop B might decide to change access point AP2 to another type of access point or turn it off, reconfigure it, or move it. This can lead to situation that at least a few persons will have "non-verified" message when they are in location x since AP2 is not existing. According to one embodiment, the verification server can change the associated fingerprint in the database according to a rule set. An example of a rule set can be, for example, that after 5 users have claimed the check-in with the new fingerprint (with no AP2), this is assumed as new verified fingerprint of the location x.

Figure 7:
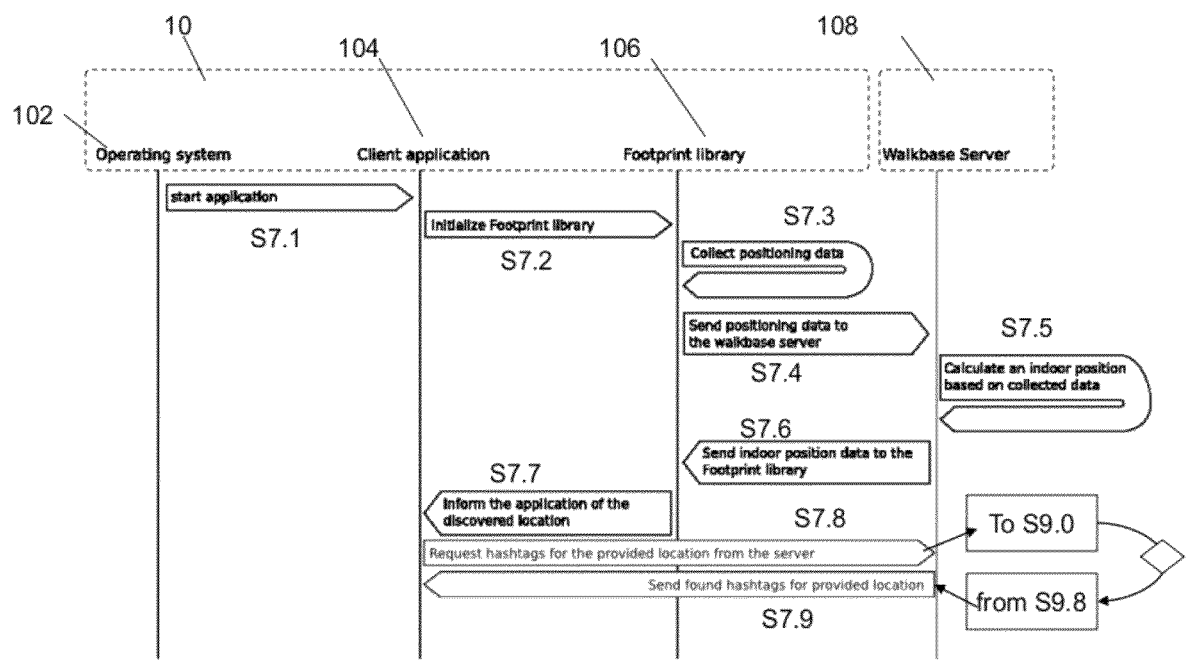
FIG. 7 is a flow chart related to providing additional information to a mobile terminal related to a location derived from fingerprint information.

FIG. 7 illustrates another embodiment incorporating aspects of the present disclosure. Mobile terminal 10 can have an Operating System 102 such as Android™ or iOS or Linux™ or Symbian™, or such other suitable operating system installed in the terminal. Such mobile terminals typically have the capability to enable users to download and install client applications. In one embodiment a client application 104 is installed in the mobile terminal. The client application 104 can be started by an operating system in step S7.1. (typically originally initiated by the user). In this embodiment, the client application 104 communicates over an Application Program Interface (API) with a Footprint Library 106 software component as shown in the step S7.2. The Footprint Library 106 software is used in the embodiment for collecting positioning data in step a S7.3. Positioning data is sent from mobile terminal 10 to verification server system 108 (Walkbase™ server) in step S7.4 over for example a wireless connection. The system 108 can include the same components as verification server 403/404. Additionally the system 108 might include for example connection to $3^{rd}$ party services or it might include other services such as a microblogging server. The Walkbase server 108 uses an algorithm to calculate the indoor position and to derive location ID and other related information corresponding to the location in step S7.5. The indoor position identification and other parameters are sent back to mobile terminal 10 in step S7.6. The Footprint library 106 software component informs, via the API, the application 104 of the discovered location and forwards other parameters. In other words, this embodiment of the present disclosure enables an architecture where an application can use the API to get location information for the application. This is useful since it enables an easy way for any application developer to use location information derived from a location service such as a Walkbase™ server. In a step S7.8, the application makes a request to a server system for information related to location. In one embodiment the application relates to Twitter™ type of micro blogging (http://www.twitter.com), i.e. the application request hashtags related to the location from the server system.

Figure 9:
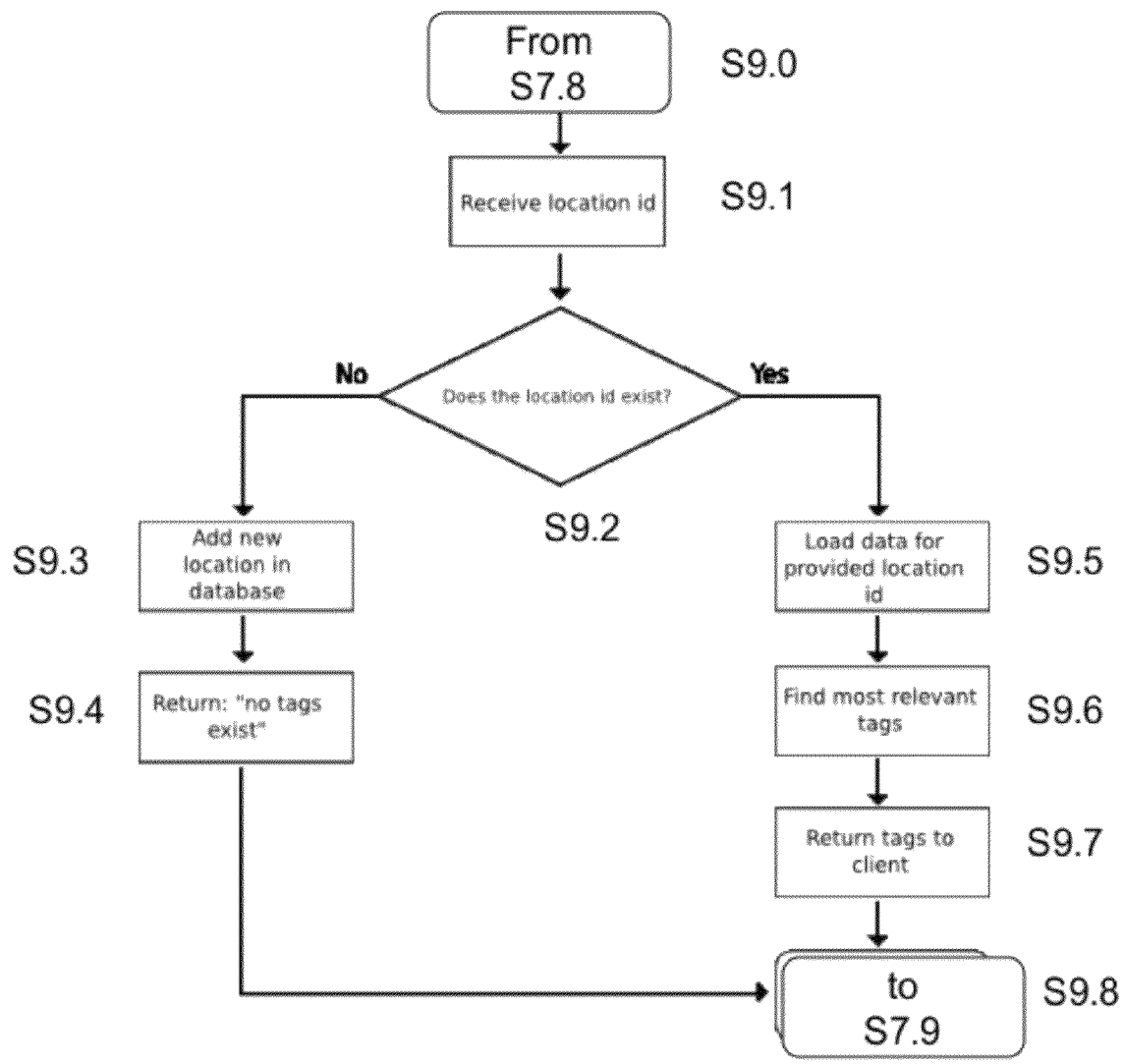
FIG. 9 is a flow chart related to providing information to a mobile terminal from a server.

FIG. 9 shows steps related to selection of appropriate hashtags for the application. The process can be initialized by S7.8 in step S9.0. In practice the process receives an input location ID from the mobile terminal 10 (step S9.1). In step S9.2, the database is checked to determine if the location ID exists or not. In case the location ID is new for the database (i.e. no correlating fingerprint was found), in step S9.2, a new location is added to database and "no tags exists" information is returned to mobile terminal in step S9.4. Depending on the implementation of the application 104 the fact that the location ID was new with no associated name/tag/hashtag might initiate dialogue with the user of the mobile terminal 10. The dialogue might include a question from the user of as to which location he is in or at, at the moment. The input to the question can be used to populate the location ID database with name of the location. In case the location ID exists in the database, data related to provided location ID is extracted from the database in step S9.5. Most relevant tags are selected in step S9.6 to be sent to mobile terminal application 104. Relevancy can be determined by looking at associated preference weights for each of possible tags. Preference weights can be for example the popularity of a tag in the location, recently used tags for the location or in sponsored tags for the location. Sponsoring refers to for example a store owner sponsored tag to be provided to a user. Typically business arrangements include money transactions between the store owner and verification service owner in this context. Tags are sent to mobile terminal in step S9.7 and the process returns to S7.9.

The server system component for associating hashtags to locations returns one or more hashtags which are associated with the location in step S7.9. The hashtags can be in the Walkbase™ server system 108 or those can come from other sources such as 3$^{rd}$ party servers hosting information. Hashtags are commonly used identification in communication related to Twitter™. Hashtag words are typically marked with #-symbol in the front of the word i.e. #London, #Patent, #TPS. The hashtags can be used in the Twitter™ environment to group and sort discussions.

Figure 8:
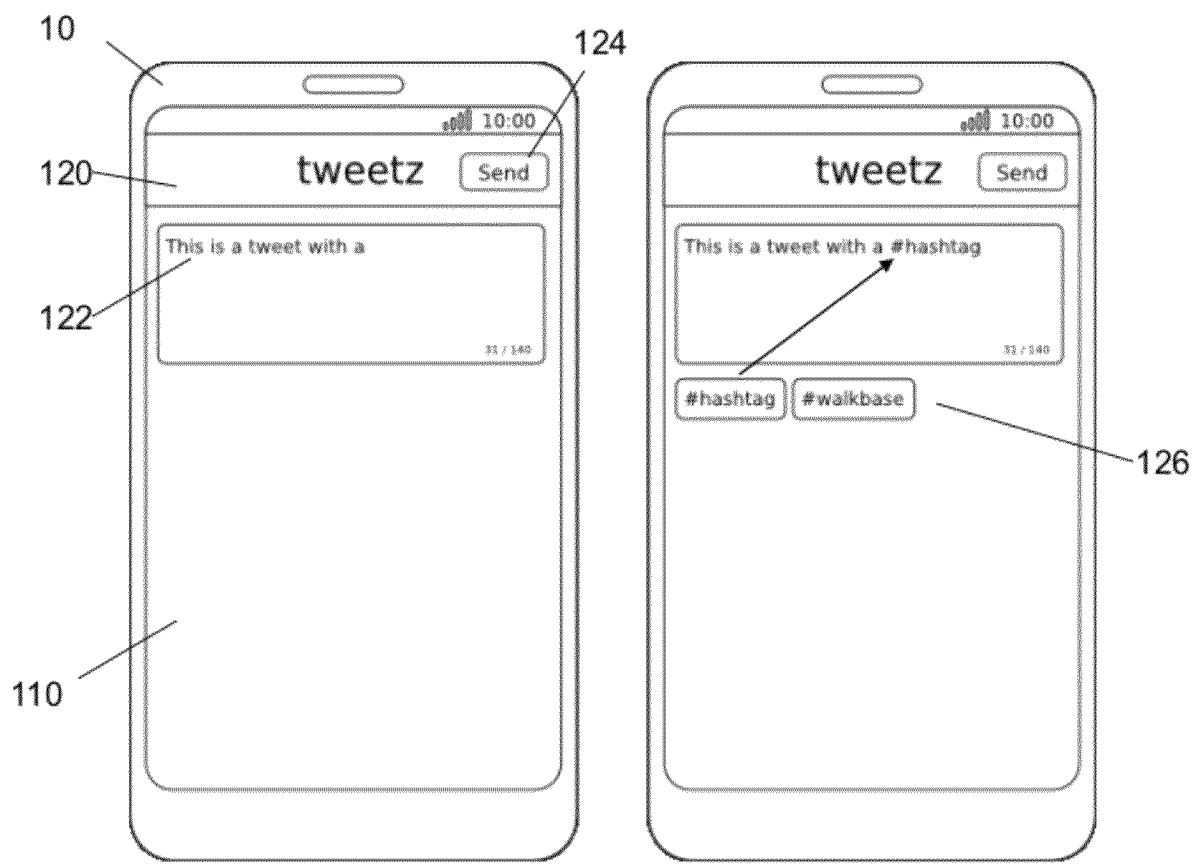
FIG. 8 shows a schematic diagram of mobile terminal user interface and use case example of some embodiments.

FIG. 8 shows an example application 104 according to one embodiment. The mobile terminal 10 can have a screen 110 (typically a touch screen with a touch sensitive part in the front of the display part) for providing output and input means to mobile terminal user interface (UI). The client application 104 in the example is called "tweetz". The application name 120 is shown in display. The application has an input area 122 for user to enter text with keyboard, touch screen, audio control etc. In this example, the user has entered the text "This is a tweet with". The application "tweetz" uses an API to communicate with the Footprint library component 106 to get the location of the terminal 10. The application 104 requests the hashtags related to the location. The received hashtags are shown in the mobile terminal 10 screen (right side UI example picture of the FIG. 8). The user can click with a finger (or other input means) on the proposed hashtag and the application appends the hash tag in the input area 122 as part of the tweet. The tweet can be sent by the user by pressing "Send" button 124 in the touch screen 110.

Figure 10:
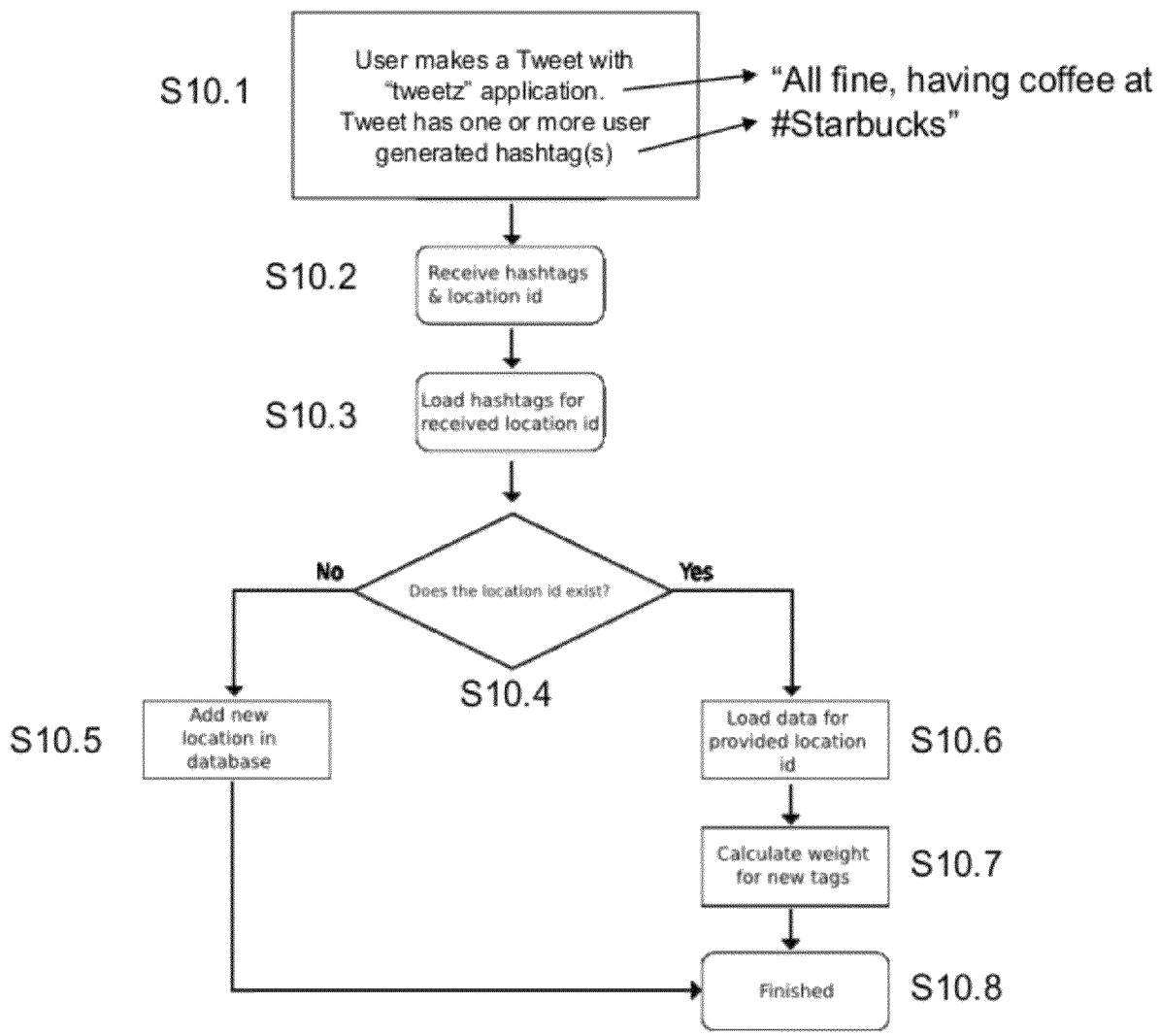
FIG. 10 is a flow chart related to a user sending a communication to a server and a process of weighting information within the communication.

FIG. 10 shows an exemplary flowchart on how to populate the hashtag database related to a location identification (ID). In step S10.1 a user of mobile terminal 10 uses the "tweez" application 104 and writes a microblog entry (for example tweet: "All fine, having coffee at #Starbucks™"). The tweet is sent from the mobile terminal 10 to server system 108 in step S10.2. The server system hashtag/location ID analysis component loads the hashtags and received location ID in step S10.3. If the location ID does not exist (step S10.4) i.e. the fingerprint sent from the mobile terminal is new and the location ID is added to the database in Step S10.5. The used hashtag can be associated with the location ID. This is beneficial since it enables to name places by associating location ID with information within the communication. In case the location ID exists, the used hashtags in the communication are added to database and associated with the location ID in step S10.6. Weights for the tags are calculated in step S10.7. Example ways of calculating weights is for example the number of times the hashtag has been used in the location ID, the average number of times of using tags during certain time (i.e. last minute, hour, day, week, etc). Also weighting can be calculated for example by grouping similar hashtags together, i.e. for example #starbucks relates to coffee shop brand Starbucks™, but names like #coffee relates to coffee, and for example the acronym #SB can refer to Starbucks™ to mention a few. Calculated weights for the tags are updated to the database and the process of weighting and recording new locations is finished in step S10.8. The aspects of the disclosed embodiments are not limited to hashtags, but can include any part or type of the communication sent from the mobile terminal or actions other than communication can be used to name location ID.

Additional examples of the exemplary application 104 can be messaging applications such as email applications, short message service (SMS) messages, multimedia message service (MMS) messages, games, mapping, social network applications such as Facebook™, and search applications for making Google™ searches, for example.

Figure 11:
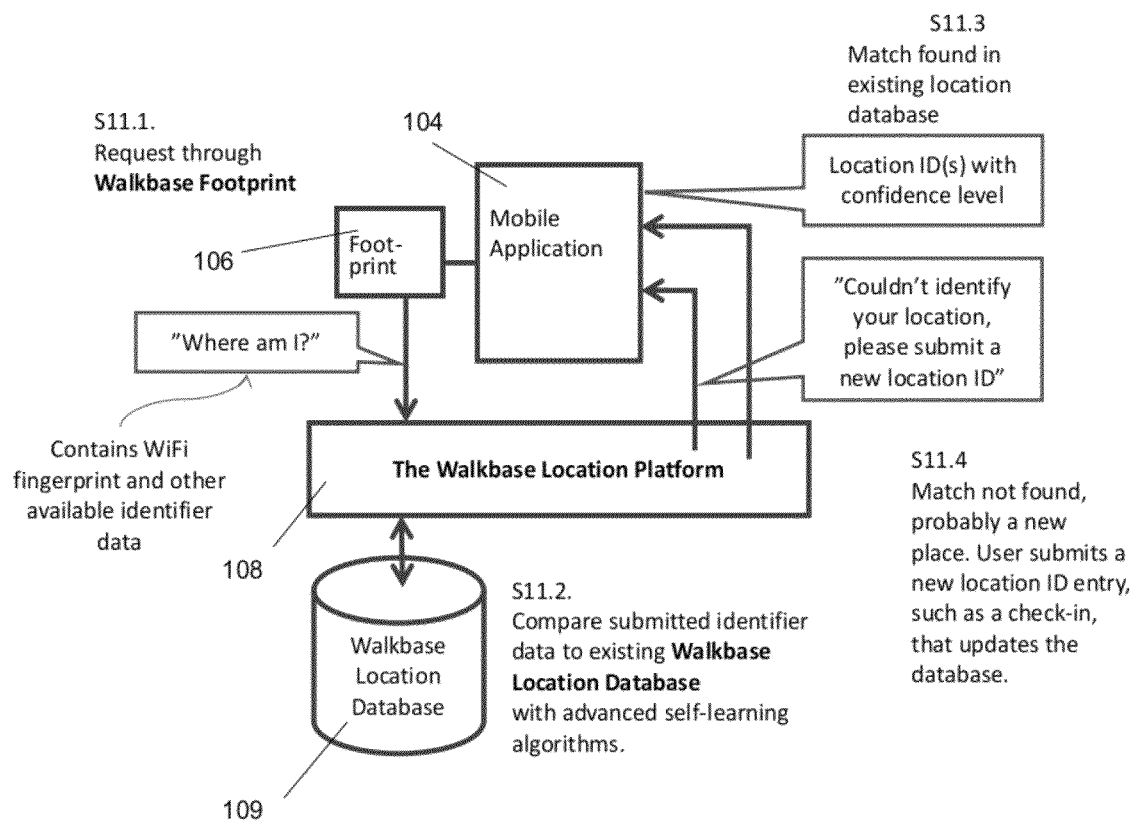
FIG. 11 is a flow chart related to a process of inquiring from a customer for a new name for the location and one process related to providing a confidence level of being in a given location.

FIG. 11 shows a flow chart illustrating one embodiment of a process incorporating aspects of the present disclosure. In this example, the mobile application 104 sends a "Where am I?"-type request via the Footprint API 106 in step S11.1. The request can include parameters such as a Wi-Fi fingerprint and other available identifier data. Other data might be A-GPS (Assisted-Global Positioning System) data, audio fingerprint, information about routers and bases stations etc. The request is received by the Walkbase Location Platform 108. The location platform includes database 109. In step S11.2, the submitted identifier data is compared with the location database in order to find a match to a pre-recorded location. The data analysis can be done for example using database queries or with self-learning algorithms such as neural network types of algorithms. If a match is found (step S11.3), the location ID is sent back to mobile terminal application 104. The location information ID can include in addition to the ID, the name of the place or other parameters such as associated tags. According to one embodiment, the location information parameters can include a confidence level of the ID. The confidence level refers in this context to the probability that the place is as indicated. For example, "You are at Starbucks™ with 90% probability", "You are at mall xxx with 80% probability", "You are at home with 95% probability". The application might also show more than one probability at the same time, i.e., "You are at Mall Skannsi with 95% probability" and "in Starbucks™ on 3$^{rd}$ floor with 84% probability." In the case of not finding a match, or a good enough match, (where the probability below set threshold such as below 50% accuracy etc) for location, application can be configured to ask the user to name the place in step S11.4. Example: "It seems that you are first one here, can you name the place for us?" In case the user names the place, the user might be given compensation in form of money, credits, social value, and can be nominated as the "founder" of the place etc.

Figure 12:
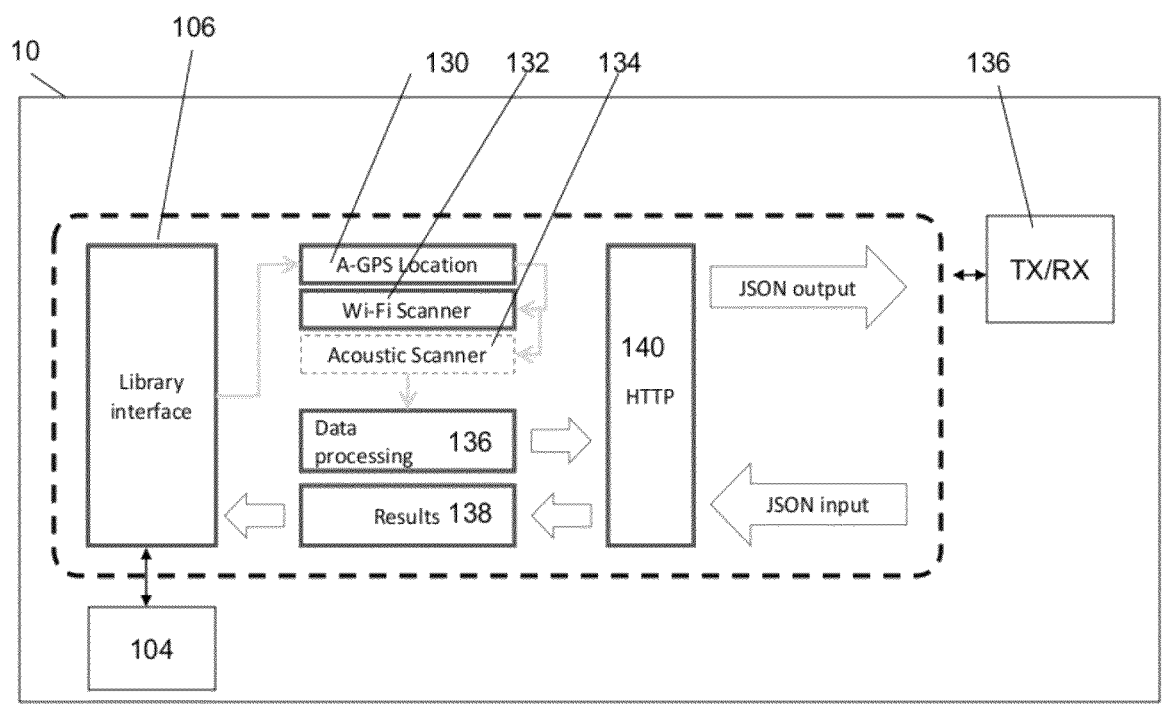
FIG. 12 shows an exemplary embodiment of some functional components in mobile terminal.

FIG. 12 shows one embodiment of an exemplary architecture of a mobile terminal 10 incorporating aspects of the disclosed embodiments. The footprint library interface 106 API is used to provide location related services to the target application 104. Some of the methods of deriving location information includes usage of A-GPS location 130, Wi-Fi scanner module 132 for measuring Wi-Fi fingerprint and acoustic scanner 134 for measuring audio sample of the location. An audio sample can be used to identify in which room the person is since many rooms have typical background noise from machines, air-condition etc. The communication to the server system is preferably done over Hypertext transfer protocol (HTTP) using for example Java Script Object Notification (JSON). The mobile terminal can communicate via the transmitter/receiver (TX/RX) logic over cellular network or local area network.

Figure 13:
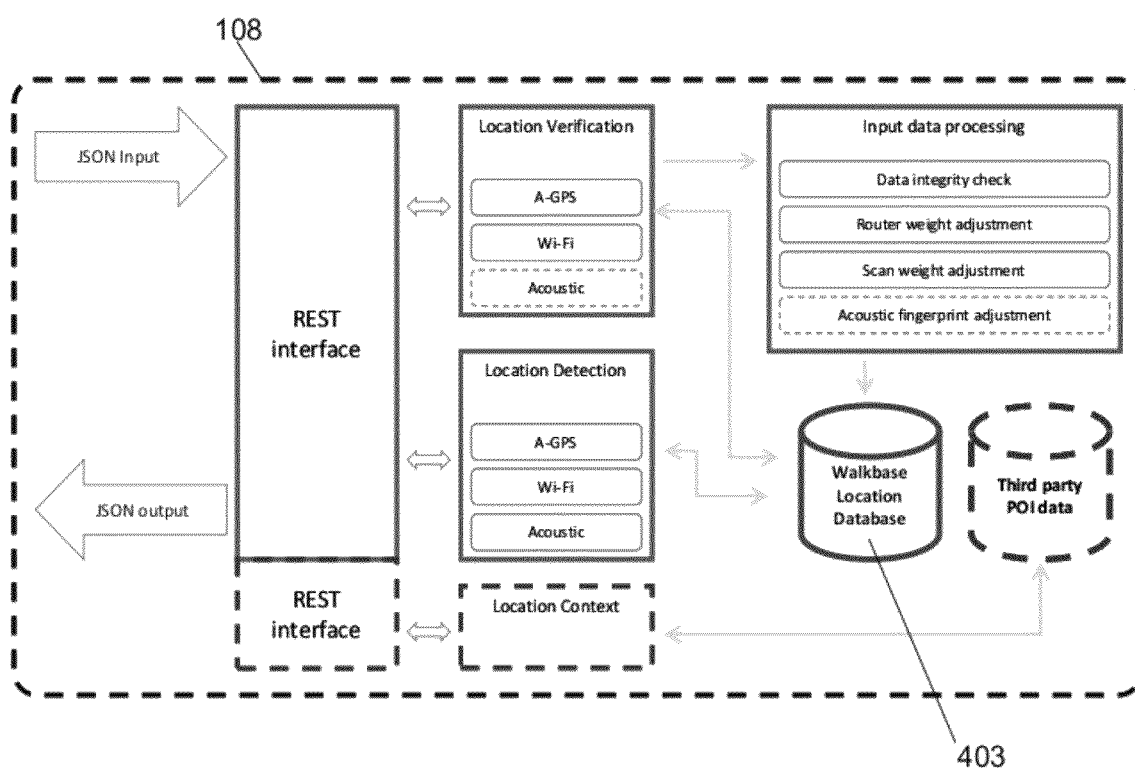
FIG. 13 shows an example embodiment of a verification service server end.

Hardware for Service Servers:

The verification service can run in a server capable of load balancing and a database for storing the recorded data. The server can be part of a cloud computing grid that allows for easy scaling when necessary. FIG. 13 shows example embodiment of verification server 108 set up. Inputs from mobile devices are received as JSON Input via REST (Representational state transfer) interface. Location verification algorithms can use information from A-GPS, Wi-Fi scans and acoustic scanner (if available) in a layered manner, each information bringing more confidence on the location verification process. Information is analysed and appropriate weighting of the results are done in server system. Updated location related parameters are stored in the database 403. Location detection modules can use information from the database 403 to detect the location of the terminal. There can be an interface to $3^{rd}$ party point of interest (POI) data from server system or it can be integrated as part of the server system. POI data can be used to provide location context related information to mobile terminals and also mobile terminals can update POI data. An example of POI data can be association of Twitter™ communications to a location.

In some embodiments, fingerprint matching to certain locations/places can be done in the mobile terminal without need for on-line connection to servers. In this embodiment, the mobile terminal can include a database for storing a set of fingerprints and related place identification codes or place names.

In some embodiments, verification services, related database and check-in services might be implemented by a single party in the same server (logical or physical) so the functionality of check-in and verification can be distributed or handled by the same party.

The aspects of the disclosed embodiments will also include processing devices, such as processors, microprocessors, computer program products and computer readable media that are configured to execute program code and computer readable instructions to carry out the methods and processes described herein. In one embodiment, the computer readable media includes non-transitory memory devices.

In other embodiments, verification is operated by a third party, other than the check-in service, in order to enable multiple different check-in service providers to verify or access verified place information.

Thus, while there have been shown, described and pointed out, fundamental novel features of the invention as applied to the exemplary embodiments thereof, it will be understood that various omissions and substitutions and changes in the form and details of devices illustrated, and in their operation, may be made by those skilled in the art without departing from the spirit of the invention. Moreover, it is expressly intended that all combinations of those elements and/or method steps, which perform substantially the same function in substantially the same way to achieve the same results, are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An apparatus configured to verify a desired location of a mobile terminal comprising:
    a positioning device coupled to the mobile terminal, the positioning device configured to obtain coarse location information corresponding to a current position of the mobile terminal; and
    a controller coupled to the mobile terminal, the controller having a memory in communication with a processor, the memory including program instructions for execution by the processor to:
        collect the coarse positioning data corresponding to the current location of the mobile terminal;
        verify that the coarse location information approximately corresponds to relative position of the desired location;
        collect and store first Wi-Fi RSSI fingerprint data corresponding to the current location of the mobile terminal if the coarse location information corresponds to the relative position of the desired location; and
    verify that the stored first Wi-Fi RSSI fingerprint data corresponds to the desired location by comparing the stored first Wi-Fi RSSI fingerprint data with second Wi-Fi RSSI fingerprint data, and determining that the second Wi-Fi RSSI fingerprint data is the same as the stored first Wi-Fi RSSI fingerprint data.

2. The apparatus of claim 1, wherein the position device comprises an A-GPS device.

3. The apparatus of claim 2, further comprising a Wi-Fi scanner or an acoustic scanner for providing the precise location data.

4. The apparatus of claim 3, wherein the memory includes program instructions for execution by the processor to:
    scan available wireless access points corresponding to the current location;
    record signal output data corresponding to each available wireless access point; and
    verify the first Wi-Fi RSSI fingerprint data using the recorded signal output data corresponding to the available wireless access points.

5. The apparatus of claim 1, wherein verifying the first Wi-Fi RSSI fingerprint data comprises RSSI fingerprint matching.

6. The apparatus of claim 1, the memory further including program instructions for execution by the processor to download at least one coupon corresponding to the verified current location.

7. The apparatus of claim 1, the memory further including program instructions for execution by the processor to transmit the coarse location data to a verification service and receive verified coarse location data information from the verification service.

8. The apparatus of claim 1, the memory further including program instructions for execution by the processor to transmit the first Wi-Fi RSSI fingerprint data to a verification service and receive data from the verification service comparing the first Wi-Fi RSSI fingerprint data with the second Wi-Fi RSSI fingerprint data.

9. A method, comprising:
receiving at a verification server system, a location identification verification request, the request including a location identification parameter comprising a first Wi-Fi RSSI fingerprint;
comparing, using a database query, the received identification parameter with one or more pre-stored identification parameters comprising second Wi-Fi RSSI fingerprints;
if a match exists wherein the first Wi-Fi RSSI fingerprint and at least one of the pre-stored second Wi-Fi RSSI fingerprints are the same, sending a corresponding location identifier to verify the location; or
if no match exists, requesting additional location identification information.

10. The method of claim 9, wherein the location identification parameter further comprises GPS data, audio data or router data.

11. The method of claim 10, where the corresponding location identifier includes a location name, a location place, a location tag and a confidence level associated with the identified location.

12. The method of claim 9, comprising:
receiving a first communication including location related information;
identifying a location identifier associated with the location related information;
storing the first communication with the location identifier; and
providing the first communication responsive to the location identification verification request.

13. The method of claim 12, wherein identifying the location identifier associated with the location related information comprises comparing fingerprint data associated with location related information to stored fingerprint data to identify a match.

14. The method of claim 9, wherein the location identification verification request includes a request for location context information, the method comprising retrieving context information associated with the matched location parameter, and transmitting the context information to a mobile terminal.

15. The method of claim 9, wherein the location identification verification request includes a message, the method comprising:
compare the identification parameter to a database of identification parameters;
determine if the identification parameter is associated with a new location;
associate the identification parameter to the database if new; and
associate the message with identification parameter associated to the database.

16. The method of claim 15, wherein the message is a hashtag.

17. The method of claim 16, comprising generating a new hashtag including the identification parameter from the database and transmitting the new hashtag and identification parameter to the mobile terminal.

18. A system for verifying a location of a mobile terminal, comprising:
a verification server; and
a verification database coupled to the server, wherein the verification server comprises a memory in communication with a processor, the memory including program instructions for execution by the processor to:
detect a location verification request for a desired location of the mobile terminal;
receive coarse location data corresponding to a current location of the mobile terminal;
determine if the coarse location data corresponds to a general area of the desired location;
receive and store first Wi-Fi RSSI fingerprint data corresponding to the current position of the mobile terminal; and
determine that the stored first Wi-Fi RSSI fingerprint data corresponds to the desired location by comparing the stored first Wi-Fi RSSi fingprint data with second Wi-Fi RSSI fingerprint data, and determining that the second Wi-Fi RSSI fingerprint data is the same as the stored first Wi-Fi RSSi fingerprint data.

19. The system of claim 18 comprising storing the precise location data corresponding to the current location of the mobile terminal; assigning an identifier to the precise location data corresponding to the current location; and validating the current location as the desired location.

20. The system of claim 19,
wherein the location verification request includes a location identifier and a message, the memory includes program instructions for execution by the processor to:
compare the location identifier to a database of location identifiers;
determine if the location identifier is new;
associate the location identifier to the database if new; and
associate the message with a corresponding location identifier in the database.

21. The system of claim 20, wherein the message is a hashtag.

22. The system of claim 21, wherein the memory includes program instructions for execution by the processor to generate a new hashtag including the location identifier from the database and transmit the new hashtag and location identifier to the mobile terminal.

23. The system of claim 19, wherein the location verification request includes a request for location context information, and wherein the memory includes program instructions for execution by the processor to associate a location identifier of the desired location, retrieve context information associated with the location identifier, and transmit the context information to the mobile terminal.

24. The system of claim 19, wherein the memory includes program instructions for execution by the processor to:
receive a first communication including location related information;
identify a location identifier associated with the location related information;
store the first communication with the location identifier; and
provide the first communication responsive to a location verification request upon determining that the current location corresponds to the location identifier.

* * * * *